United States Patent
Kodaka et al.

(10) Patent No.: US 7,160,413 B2
(45) Date of Patent: Jan. 9, 2007

(54) LAYERED SUPPORT AND METHOD FOR LAMINATING CMP PADS

(75) Inventors: Ichiro Kodaka, Berkeley, CA (US); Charles Sischile, Alameda, CA (US); Alvin Timbang, Union City, CA (US); Margarita Castillo, Union City, CA (US); Claughton Miller, San Carlos, CA (US)

(73) Assignee: Mipox International Corporation, Hayward, CA (US)

( * ) Notice: Subject to any disclaimer, the term of this patent is extended or adjusted under 35 U.S.C. 154(b) by 249 days.

(21) Appl. No.: 10/754,381

(22) Filed: Jan. 9, 2004

(65) Prior Publication Data

US 2005/0150594 A1    Jul. 14, 2005

(51) Int. Cl.
*B24D 11/00* (2006.01)
(52) U.S. Cl. ............... 156/289; 451/533; 451/538
(58) Field of Classification Search ........... 451/533, 451/538, 539; 156/289, 580, 583.1
See application file for complete search history.

(56) References Cited

U.S. PATENT DOCUMENTS

| | | |
|---|---|---|
| 3,598,684 A | 8/1971 | Militana et al. |
| 3,616,029 A | 10/1971 | Lerman |
| 3,921,344 A | 11/1975 | Goodwin |
| 3,940,864 A | 3/1976 | Kanzelberger |
| 4,158,587 A | 6/1979 | Keller et al. |
| 4,199,391 A | 4/1980 | Andrews |
| 4,347,281 A | 8/1982 | Futcher et al. |
| 4,461,800 A | 7/1984 | Tanaka |
| 4,734,155 A | 3/1988 | Tsunoda et al. |
| 4,780,361 A | 10/1988 | Schlein |
| 4,861,648 A | 8/1989 | Kleinschmidt et al. |
| 4,885,317 A | 12/1989 | Thein et al. |
| 5,129,978 A | 7/1992 | Binks |
| 5,205,035 A | 4/1993 | BiAngelo et al. |
| 5,472,556 A | 12/1995 | Sanko |
| 5,487,780 A | 1/1996 | Ritter |
| 5,505,801 A | 4/1996 | Harris |
| 5,573,622 A | 11/1996 | Hass et al. |
| 5,762,752 A | 6/1998 | Sawano et al. |
| 5,855,733 A * | 1/1999 | Douglas et al. ......... 156/583.1 |
| 5,989,377 A | 11/1999 | Wilheim et al. |
| 6,040,253 A * | 3/2000 | Hennecken ............. 442/239 |
| 6,146,490 A | 11/2000 | Ensign |
| 6,179,951 B1 | 1/2001 | Natarajan et al. |
| 6,210,257 B1 | 4/2001 | Carlson |
| 6,290,883 B1 | 9/2001 | Crevasse et al. |
| 6,428,586 B1 | 8/2002 | Yancey |
| 6,458,023 B1 | 10/2002 | Moon |

(Continued)

FOREIGN PATENT DOCUMENTS

EP          978528 A1 *    2/2000

(Continued)

*Primary Examiner*—Jeff H. Aftergut
*Assistant Examiner*—John L. Goff
(74) *Attorney, Agent, or Firm*—Sheppard Mullin Richter & Hampton LLP

(57) ABSTRACT

A device and method for laminating CMP pads includes supporting the CMP pad with a board having material compositions similar to the CMP pad. By thus supporting the CMP pad during lamination, there is less likelihood of damage to the CMP pad and better adhesion from lamination. In particular, the CMP pad materials are laminated while in contact with a first board that may have a recess to accept the CMP pad. The pad has dimensions that are equal to or greater than the pad material. In an alternative embodiment, a board is provided on the opposite side of the CMP pad for lamination.

25 Claims, 7 Drawing Sheets

U.S. PATENT DOCUMENTS

| | | |
|---|---|---|
| 6,513,414 B1 | 2/2003 | Denney et al. |
| 6,514,888 B1 | 2/2003 | Tanaka et al. |
| 6,746,311 B1 * | 6/2004 | Kessel ......................... 451/41 |
| 6,783,437 B1 * | 8/2004 | He .............................. 451/41 |
| 2003/0013398 A1 | 1/2003 | Chiou et al. |

FOREIGN PATENT DOCUMENTS

| | | |
|---|---|---|
| JP | 08174405 A | 7/1996 |

* cited by examiner

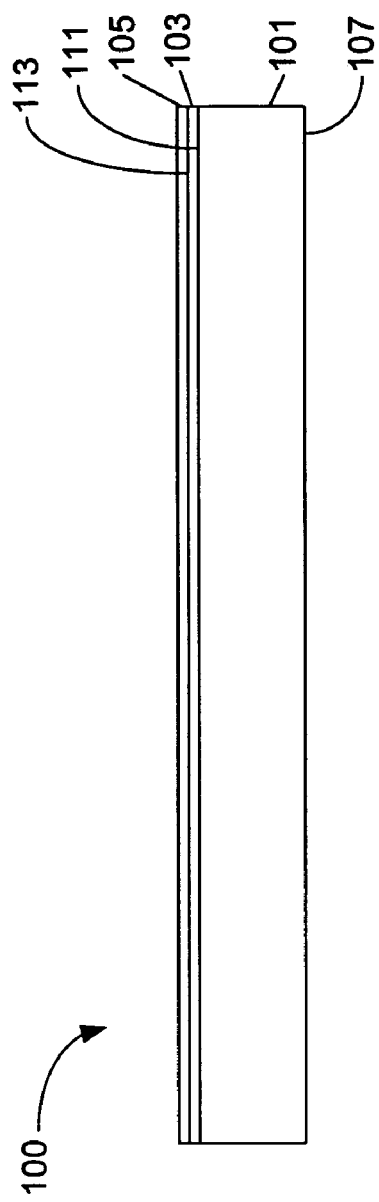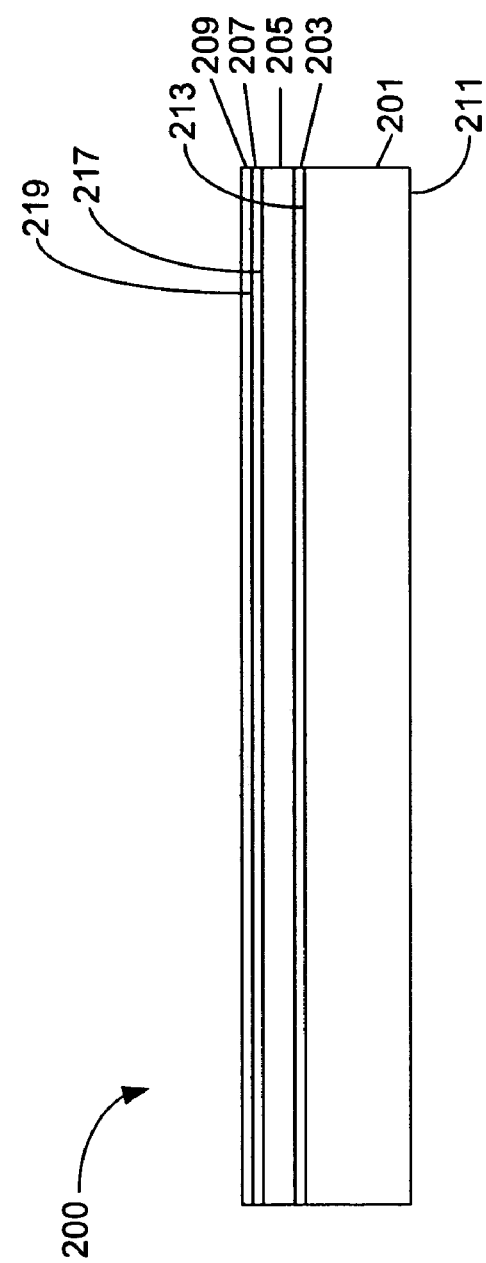
FIG. 1
FIG. 2

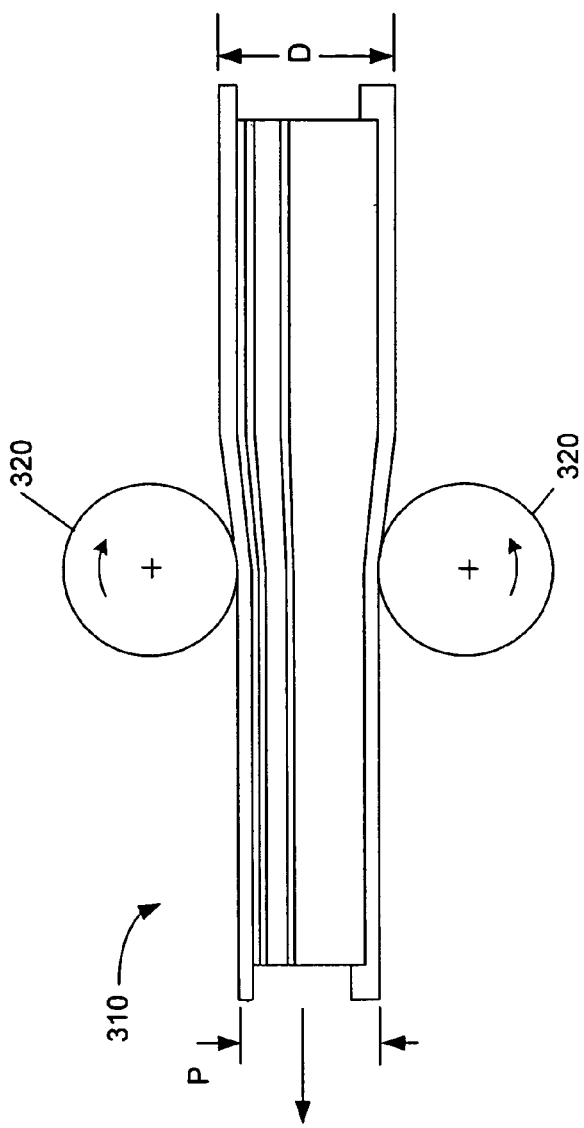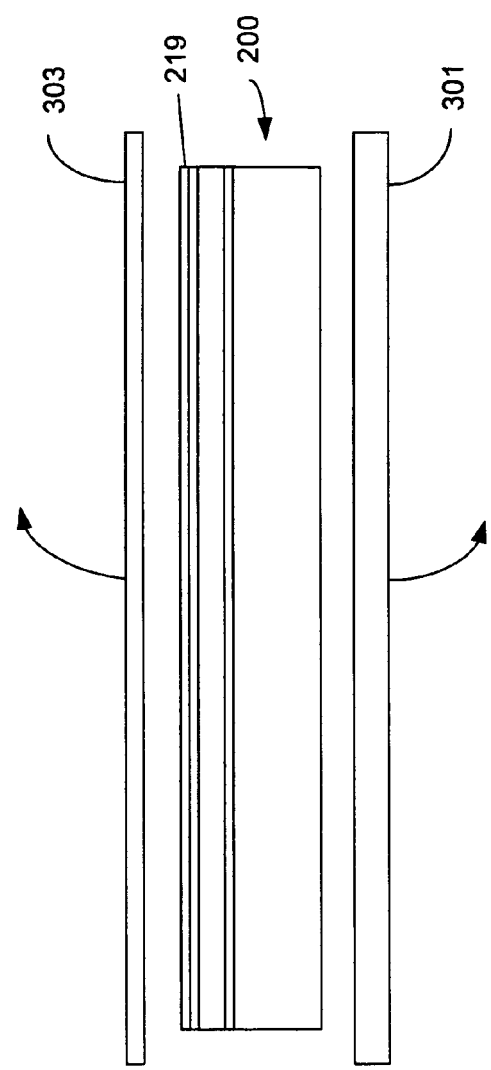

LAYERED SUPPORT AND METHOD FOR LAMINATING CMP PADS

FIELD OF THE INVENTION

This invention is related to a method for producing chemical mechanical planarization (CMP) polishing pads. In particular, the present invention is directed to a method of laminating an adhesive layer to a CMP polishing pad.

BACKGROUND OF THE INVENTION

CMP polishing pads (or "CMP pads") are components of CMP systems that polish, or "planarize," surfaces. CMP is one step in manufacturing of many semiconductor and optical components. For example, CMP is an intermediate step in semiconductor wafer processing of electronic devices, where it is used to planarize the surface between processing steps.

CMP systems polish by the action of a CMP pad attached to a platen of a CMP system and a chemically abrasive slurry moving across the surface of a work piece. CMP pads can be made of one of a variety of materials, including thermoplastics or fabrics, in the form of solid surfaces, surfaces with grooves, or felts, and the slurries typically include abrasive particles in a chemical etchant. The CMP pad and work piece move relative to each other in a motion that is intended to ensure uniform polishing—usually in a complex motion combining rotation and orbiting. In addition, uniform polishing is accomplished by having the CMP system deposit fresh slurry and remove the slurry from the work piece.

CMP pads are disposable components that can be attached to the platen by an adhesive. Typically, CMP pads are provided to the CMP equipment user with either a pressure sensitive adhesive (PSA) or a thermoset, or heat-activated, adhesive. A PSA has a release liner over the adhesive that is removed prior to placing the CMP pad on the platen. The the thermoset adhesive is heated to activate the adhesive.

The PSA may be provided as a roll or sheet of film having the PSA on one side and a second adhesive on the back side. The fabrication of a CMP pad with a PSA and release liner is usually accomplished by lamination of the backside of the PSA film to the backside of a CMP pad material. Specifically, the CMP pad material and the PSA film with release liner are fed through the pinch rollers of a laminator. If the second adhesive is heat-actuated, then the pinch roller that presses against the PSA film is heated.

CMP pads can also be constructed of a CMP pad material and a "sub-pad" having different properties, such as different hardnesses or having conduits for the flow of abrasive fluids. These multi-layered CMP pads can be produced by laminating, in one step, the CMP pad material with a sub-pad having an adhesive on one side and a PSA film and release liner on the opposite side. Prior art methods of producing CMP pad supply the stack of CMP pad and any sub-pad material, along with the PSA film and release liner directly through the pinch rollers of a laminator.

There are several problems with this prior art method of laminating CMP pads. First, variations of the thickness of pads or sub-pads requires the adjustment of laminators, such as the gap between pinch rollers, to ensure the proper application of lamination pressure. Second, the contact of the CMP pad with the pinch rollers can damage or contaminate the front surface of the CMP pad material, especially if the rollers are made of incompatible material. For example, the rollers may physically damage the front surface of the CMP pad due to scratches on other imperfections which arise from normal wear of the rollers. Physical and chemical contamination of the work piece is of particular concern in the manufacturing of semiconductor wafers. Third, if the CMP pad surfaces are handled during laminating, the person laminating the CMP pad may damage or contaminate the pad. Fourth, non-uniformities in the laminated CMP pad, such as warping or curling, or bubbles, wrinkles, or uneven lamination in the PSA or sub-pad material can occur from improper distribution of the compressive pressure during lamination.

It would be desirable to produce a CMP pad with a PSA backing using a lamination method that overcomes the problems with prior CMP laminating methods. In particular, it would be desirable to have a method of laminating a CMP pad that does not warp or otherwise change the shape of the CMP pad, or contaminate the CMP pad. It is also desirable to have a method that allows for lamination of CMP pads with sub-pads, and that is usable for PSA films that attach to the CMP pad using either pressure or heat actuated adhesives.

SUMMARY OF THE INVENTION

The present invention solves the previously discussed problems with prior art CMP pad lamination devices and methods by providing a device and method for supporting CMP pads during lamination. The present invention provides a device and method for compensating for the thickness of CMP pads and sub-pads to reduce or eliminate the need to adjust the laminator to compensate for variations in pad thicknesses, and to protect the CMP pad surface during lamination.

One aspect of the present invention provides a method of producing a CMP pad comprising forming a stack including a board, a CMP pad material, and a backing with a PSA film having a release liner, compressing the stack to form a laminate of the CMP pad material and backing, and separating the laminated CMP pad and release liner from the board. The board and the CMP pad material have similar material compositions. In one embodiment, a second board is provided over the release liner.

Another aspect of the present invention provides a method of producing a CMP pad comprising forming a stack including a first board, a CMP pad material, and a backing of a sub-pad and adhesives with a release liner, and a second board, compressing the stack to laminate the CMP pad and sub-pad, and removing the laminated CMP pad and release liner from the boards. The boards and CMP pad materials have similar material compositions.

Yet another aspect of the present invention provides a method of producing a CMP pad using boards on one or both sides of the CMP pad. In one embodiment, the planar dimensions of each board is each equal to or greater than larger than the planar dimensions of said CMP pad material, preferably at least 10% larger. In another embodiment, each board has a thickness of from about $\frac{1}{16}$" to about $\frac{1}{4}$" with a thickness tolerance of less than about $\frac{3}{100}$". In yet another embodiment, the first board has a recess on one face for accepting the CMP pad material, with and a depth approximately 50% to approximately 90% of the thickness of said CMP pad material.

One aspect of the present invention provides a method of producing a CMP pad by laminating the pad using an adhesive that is either pressure sensitive or is heat-actuated.

Yet another aspect of the present invention provides a device to support the lamination of a CMP pad. The device comprises a board having a similar composition to the CMP pad material and having planar dimensions equal to or greater than the planar dimensions of said CMP pad material.

These features, together with the various ancillary provisions and features which will become apparent to those skilled in the art from the following detailed description, are attained by the CMP laminating devices and methods of the present invention, preferred embodiments thereof being shown with reference to the accompanying drawings, by way of example only.

BRIEF DESCRIPTION OF DRAWINGS

The foregoing aspects and the attendant advantages of this invention will become more readily apparent by reference to the following detailed description when taken in conjunction with the accompanying drawings wherein:

FIG. 1 is a side view of a CMP polishing pad formed from a CMP pad material and a PSA film;

FIG. 2 is a side view of a CMP polishing pad formed from a CMP pad material, a CMP sub-pad, and a PSA film;

FIG. 3D is a sectional side view of the stack of FIG. 3C during lamination;

FIG. 3E is a side view of the laminated CMP pad separated from the top and bottom boards;

Figure 3A:
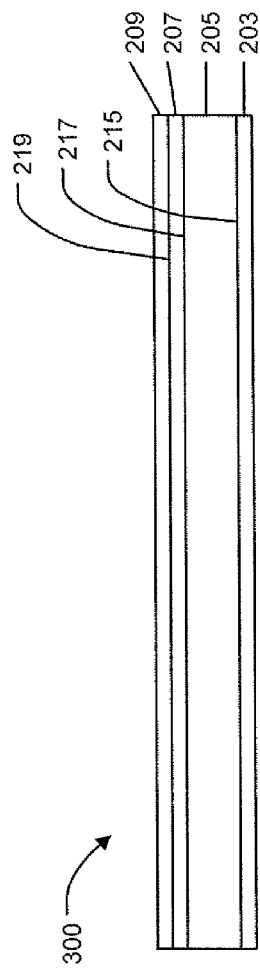
FIG. 3A is a side view of a CMP sub-pad and adhesive layers, including a PSA with a release liner and an adhesive layer for attaching to a CMP pad material.

Reference symbols are used in the Figures to indicate certain components, aspects or features shown therein, with reference symbols common to more than one Figure indicating like components, aspects or features shown therein.

DETAILED DESCRIPTION

In general, the present invention provides a device and method for producing a laminated CMP polishing pad formed from a CMP pad material and a backing, which can either be a PSA film or a CMP sub-pad with a PSA film. The present invention provides supports to one or both sides of the CMP pad components during lamination in a conventional laminator using boards formed from materials having a similar composition to the CMP pad.

The present invention is directed to the lamination of CMP pads. An exemplary CMP polishing pad 200 is shown in FIG. 2 as having a CMP pad material 201, an adhesive 203, a CMP sub-pad 205, and a PSA film 207 which has a first adhesive layer 217 and a second adhesive layer 219. CMP polishing pad 200 is one example of a CMP pad that can be manufactured using the inventive device and method, though the invention is not limited by the embodiment discussed with regard to this specific pad. CMP pad material 201 has a front surface 211 and a back surface 213, and CMP sub-pad 205 has a surface covered by adhesive 203 and a back surface 217. Adhesive 203 attaches CMP sub-pad 205 onto CMP pad back surface 213. First adhesive layer 217 attaches PSA film 207 to CMP sub-pad back surface 213, and second adhesive layer 219 attaches CMP pad 200 to a CMP system. A release liner 209 is provided over layer 219 to protect the adhesive of layer 219 prior to attaching the CMP pad to a CMP system, and to be removed to expose the PSA. In general, CMP pad material 201 and CMP sub-pad 205 are selected, as is known in the art of CMP polishing, for the ability to polish a work piece according to the hardness of the CMP pad materials, ability to direct abrasive fluids to and from a work piece, and other properties related to polishing a work piece. It is preferred that CMP pad material 201 and CMP sub-pad 205 is formed from an thermoset or a thermoplastic. It is also preferred, but not required, that CMP pad 201 and CMP sub-pad 205 are formed from materials of differing hardnesses, for example a soft sub-pad and a relatively harder CMP pad material. One exemplary CMP pad and sub-pad material is an elastomeric, such as a cast or foam urethane.

In preparing CMP pad 200 for use in a CMP system, release liner 209 is removed from layer 219, the CMP pad is aligned and placed on the platen of a CMP system, and a force is applied to CMP polishing pad 200 to affix it to the platen.

Figure 3B:
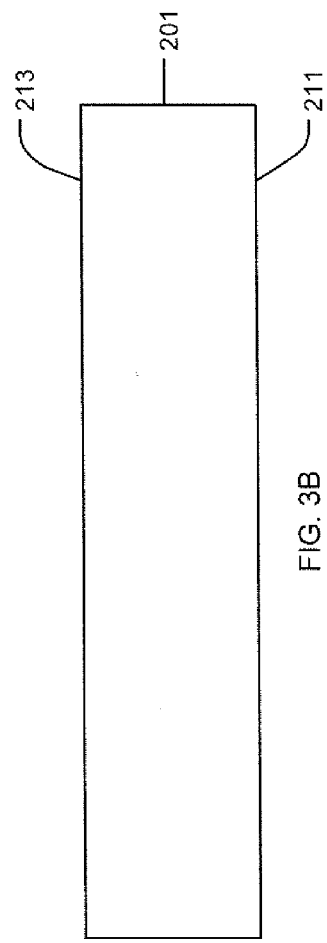
FIG. 3B is a side view of a CMP pad material.

FIGS. 3A and 3B illustrate two components of the CMP pad 200 with release liner 209 that are to be laminated by a first embodiment lamination method. Specifically, FIG. 3A is a side view of a layer 300 comprising a CMP sub-pad 205, adhesive layers 203 and 207 and release liner 209, and FIG. 3B is a side view of a CMP pad material 201. The first embodiment lamination will be described starting with a pre-laminated layer 300, or backing, that is laminated to CMP pad material 201.

Figure 3C:
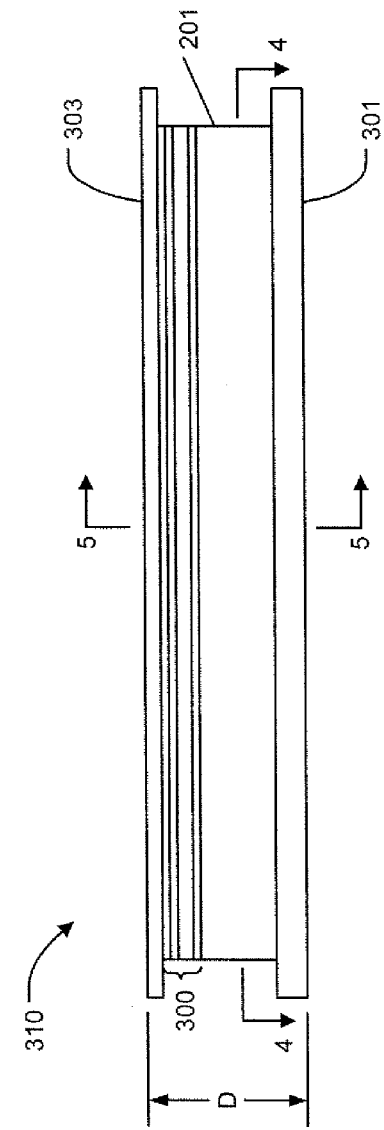
FIG. 3C is a side view of a stack of the CMP sub-pad and adhesive layers of FIG. 3A, the CMP pad material of FIG. 3B, a top board, and a bottom board with a recess.
Figure 4:
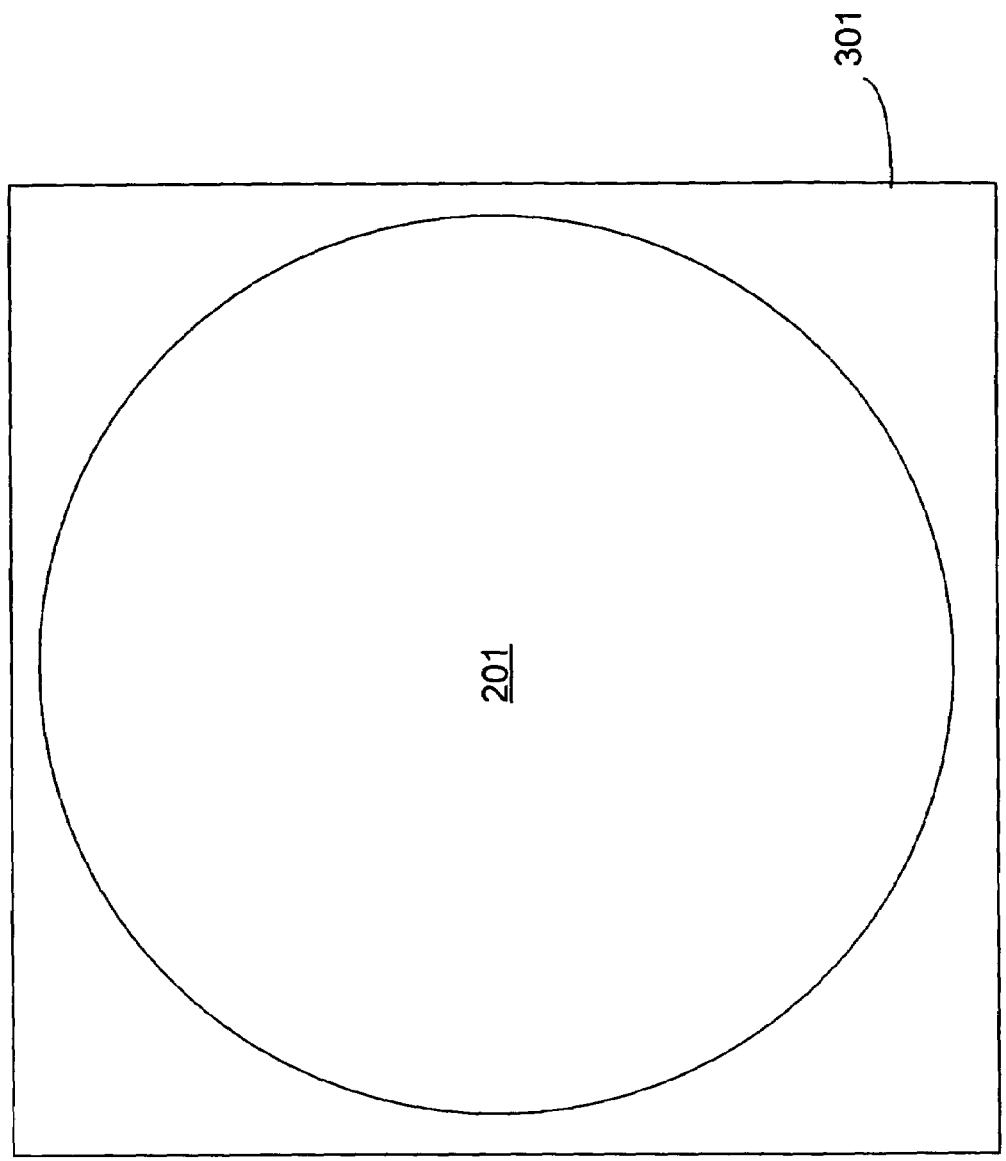
FIG. 4 is a sectional top view 4—4 of FIG. 3C showing the extent of the CMP pad and a board.
Figure 5:
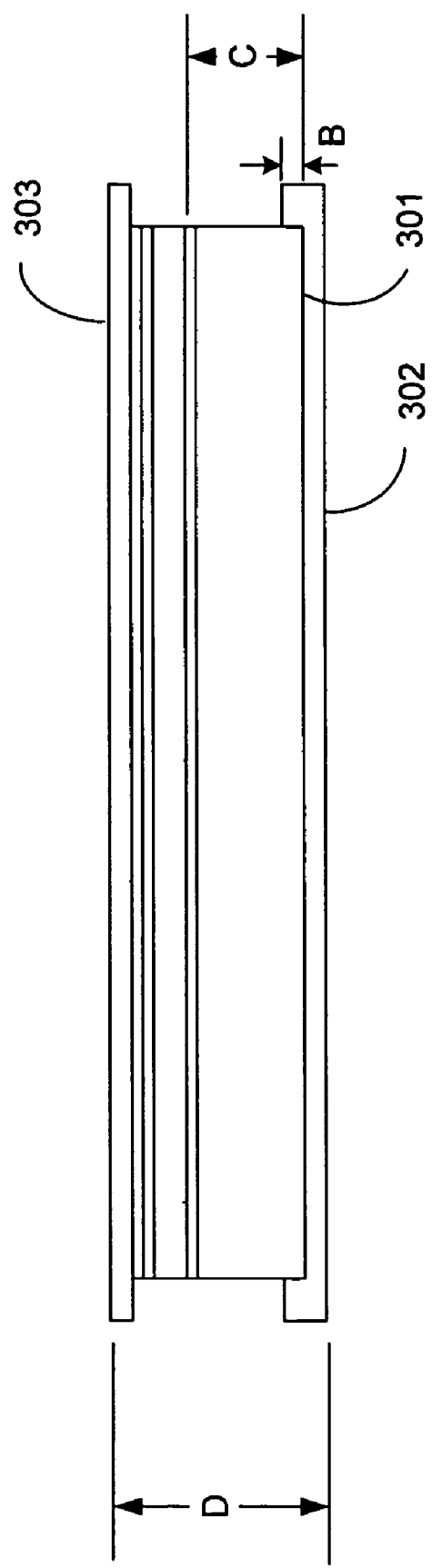
FIG. 5 is a sectional side view 5—5 of FIG. 3C showing the CMP pad for lamination and a top and bottom support board.

FIGS. 3C–3E illustrate the lamination process, where FIG. 3C is a side view of a stack 310 formed from the layer 300 of FIG. 3A, CMP pad material 201 of FIG. 3B, a top board 303, and a bottom board 301 have a recess shown in FIG. 5, FIG. 3D is a sectional side view of the stack of FIG. 3C during lamination, and FIG. 3E is a side view of the laminated CMP pad separated from the top and bottom boards. Additional views are shown in FIG. 4, which is a sectional top view 4—4 of FIG. 3C showing the extent of the CMP pad and a board, and in FIG. 5, which is a sectional side view 5—5 of FIG. 3C showing the CMP pad for lamination and a top and bottom support board. In one alternative embodiment, bottom board 301 is planar and does not have a recess.

In this embodiment, PSAs are used as adhesives between all of the components, that is adhesive 203 as well as PSA 207 are PSAs. The lamination of CMP pad 200 with release liner 209 stack 301, as illustrated in FIGS. 3C and 5, proceeds with the sequential stacking of the elements shown. First, the CMP pad material 201 is placed in recess 302 of board 301. Then layer 300 is aligned and placed on top of CMP pad material 201. Lastly, board 302 is placed, without pressing, on layer 300, forming a stack of thickness D.

After forming stack 310, the stack is fed through properly spaced pinch rollers 320 of a laminator, as shown in FIG. 3D. Specifically, stack 301, which has a thickness D as shown in FIGS. 3C and 3D, is gradually guided toward pinch rollers 320 which has a gap P of approximately 70% to 95% of the thickness D. Pinch rollers 320 rotate to simultaneously feed stack 301 and compress and laminate the stack. After passing through the laminator, laminated CMP pad 200 is separated from boards 301 and 303, as shown in FIG. 3E, leaving CMP polishing pad 200 with release liner 209.

Boards 301 and 303 are selected to have sizes and material properties according to the size and material properties of CMP pad 200. In particular, the material of boards 301 and 303 preferably have a similar composition to that of CMP pad material 201. It is preferred that CMP pad material 201, sub-pad 205, boards 301 and 303 are elastomers or thermoplastics. Common materials for CMP pad material 201, and thus boards 301 and 303 include urethane, such as cast urethane and foam urethane. Typical hardnesses for boards 301 and 303 ranges from 45 Shore A–75 Shore D for thermoplastic, for example from 25–75 Shore D for cast urethane and 45–95 Shore A for foam urethane.

Layer 300 and CMP pad material 201 have an extent in the planar dimension indicated as A in FIG. 5. It is preferred that the extent of the boards 301 and 303 are the same or are slightly greater than that of the parts to be laminated, for example dimension A of the view of FIG. 5. In the embodiment of FIGS. 3, 4, and 5, boards 301 and 303 extend over the edges of the CMP pad, as shown in the side view of FIG. 3C. In an alternative embodiment boards 301 and 303 are 10% or longer than the extent of the CMP pad. Also, it is preferred that boards 301 and 303 have a thickness of from $1/16$ to $1/4$ inch, with a flatness tolerance approximately equal or better than that of CMP pad material 201, typically greater than $3/100$ inch.

FIG. 5 also illustrates CMP pad material having a depth C, and a recess 302 in board 301 having a depth B and a planar extend that is equal to or slightly greater than A. More specifically, recess 302 has an extent that is equal to or slightly greater than A so that the CMP pad material can fit into recess 302. It is preferred that A has a range from approximately 50% to approximately 90% of C.

The use of boards 301 and 303 supports the components of CMP pad 200, protect the CMP pad surfaces from contamination and damage by pinch rollers 320, and distribute the compression over the entire CMP pad, thereby eliminating any warping (curling), bubbles, wrinkles, or uneven lamination.

An alternative exemplary CMP polishing pad 100 is shown in FIG. 1 as having a CMP pad material 101. CMP polishing pad 100 has a CMP pad material 101 and a PSA film 103 having a first adhesive layer 111 and a second adhesive layer 113. CMP pad material 101 has a front surface 107 and a back surface 111. Adhesive layer 111 attaches PSA film 103 onto CMP pad back surface 111, and adhesive layer 113 attaches CMP pad 100 to a CMP system. A release liner 105 is provided over PSA film 103 to protect the PSA prior to attaching the CMP pad to a CMP system. In general, CMP pad material 201 is selected for the ability to polish a work piece according to the hardness of the CMP pad materials, ability to direct abrasive fluids to and from a work piece, and other properties related to polishing a work piece.

In preparing CMP pad 100 for use in a CMP system, release liner 105 is removed from PSA film 103, which is aligned and placed on the platen of a CMP system, and a force is applied to CMP polishing pad 100 to affix it to the platen.

Figures 6A, 6B, 6C, 6D:
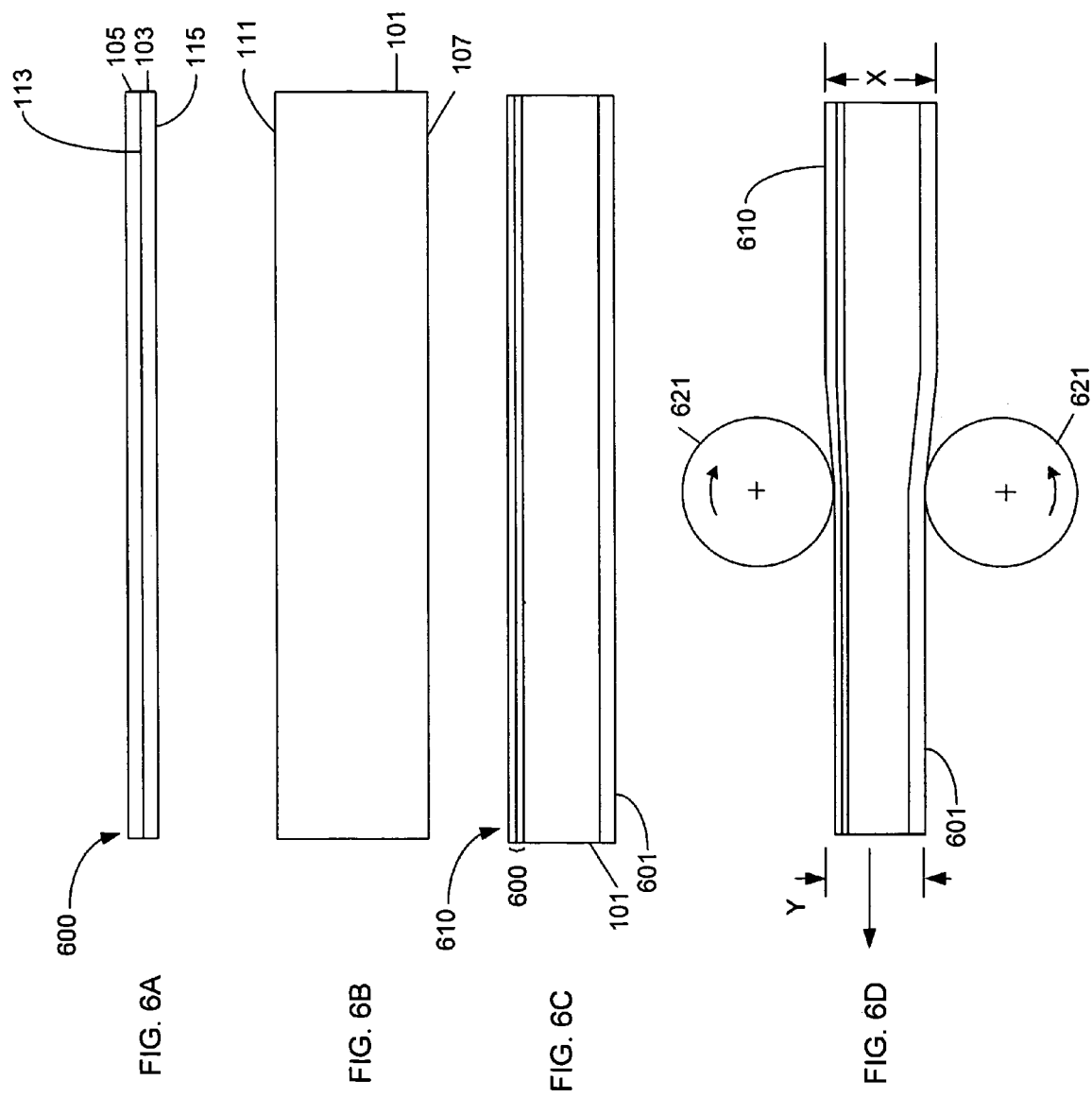
FIG. 6A is a side view of a PSA with a release liner and an adhesive layer for attaching to a CMP pad material.
FIG. 6B is a side view of a CMP pad material.
FIG. 6C is a side view of a stack of the PSA and release liner and adhesive layer of FIG. 6A, the CMP pad material of FIG. 6B, and a bottom board.
FIG. 6D is a sectional side view of the stack of FIG. 6C during lamination.

An alternative embodiment of the present invention will now be illustrated with reference to FIG. 6 for the lamination to produce the CMP polishing pad 100 with release liner 105 of FIG. 1, where adhesive 115 is a thermoset adhesive. FIG. 6A is a side view of a backing, or layer, 600 comprising a PSA film 103 having a thermoset adhesive 115 and a pressure activated adhesive 113 and release liner 105 and FIG. 6B is a side view of a CMP pad material 101. In general, CMP pad material 101 is a thermoplastic or thermoset material. An elastomer, including but not limited to a cast or foam urethane is one preferred material. As described subsequently, CMP polishing pad 100 and release liner 105 are formed by adhesive layer 115 binding PSA film 103 to CMP pad material 101.

As noted above, adhesive 115 is a thermoset adhesive, and thus the lamination of CMP polishing pad 100 necessarily includes the heating of that adhesive layer. As will be described subsequently, heating of adhesive 115 occurs by heating the portion of CMP polishing pad 100 and release liner 105 closest to the thermoset adhesive—that is by heating release liner 105. In order to facilitate heating of the adhesive, it is preferred that a board is not placed on release liner 105.

Figure 6E:
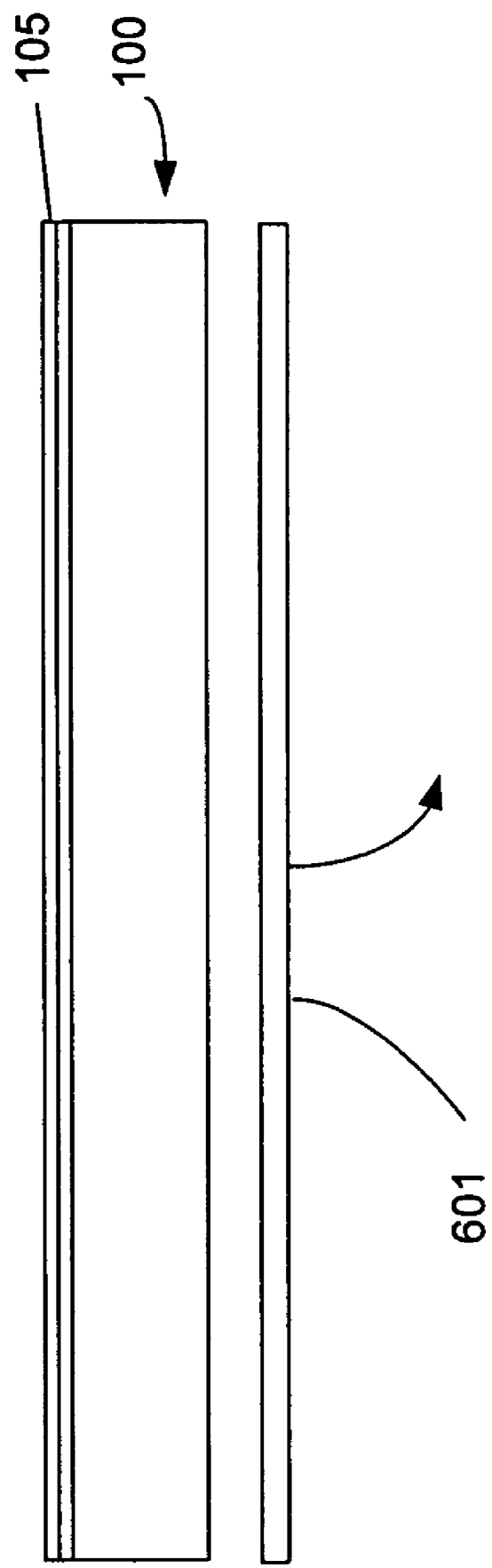
FIG. 6E is a side view of the laminated CMP pad separated from the top and bottom boards.

FIGS. 6C–6E show an alternative embodiment laminating process of the present invention, where FIG. 6C is a side view of a stack 610 formed from the layer 600 of FIG. 6A, CMP pad material 101 of FIG. 6B, and a board 601, FIG. 6D is a sectional side view of the stack of FIG. 6C during lamination, and FIG. 6E is a side view of the laminated CMP pad separated from the board.

Board 601 is provided to improve the lamination of CMP pad 100, is selected to have a size and material properties comparable to the size and material properties of CMP pad 100. The parts to be laminated, specifically layer 600 and CMP pad material 101, are placed on top of board 601. Layer 600, CMP pad material 601 and board 601 are the same size in planar dimension. It is also preferred that board 601 has a thickness of from $1/16$ to $1/4$ inch, with a flatness tolerance approximately equal or better than that of CMP pad material 101, typically less than $3/100$ inch.

Board 601 is flat, to within a prescribed flatness tolerance, and supports the front surface 107 of CMP pad material 101. Alternatively board 601 protrudes beyond the edge of CMP pad material 101 by up to approximately 10% of the extent of the CMP pad material. The material of board 601 has a similar composition to that of CMP pad material 101, for example board 601 can be a thermoplastic or thermoset material, as described previously regarding the selection of boards 301 and 303.

In preparing for the lamination of CMP pad 100, stack 601 is formed by placing CMP pad material 101 on board 601, and then layer 600 is placed flat on top of the CMP pad material. Stack 610 is then laminated and prepared as shown in FIG. 6D as a sectional side view of the stack during lamination between pinch rollers 621 and 623, and in FIG. 3E as a side view of the laminated CMP pad 100 separated from board 601. Stack 601, which has a thickness X, is then gradually guided between pinch rollers 621 and 623, which has a gap Y of approximately 70% to 95% of the thickness X. Pinch roller 621 is a heated roller, which heats adhesive 115 during lamination, using techniques that are well known in the field. Pinch rollers 621 and 623 rotate to simultaneously feed stack 601, heat and thus activate adhesive 115, and to compress and laminate the stack. After being laminated, board 601 is removed, leaving CMP polishing pad 100 and release liner 105.

By using a support board on one or both sides of a CMP pad during lamination, where the board has similar material properties with those of the CMP pad, the CMP pad is protected in several ways. Since the CMP polishing pad polishing surface does not make direct contact with the laminator rollers, the risk of surface damage and surface contamination is minimized. In addition, the support boards help disperse the pressure on the CMP pad during lamination, providing for reduced warping or curling of the pad and providing a better adhesive contact between the laminated components. Specifically, the use of boards compensates for non-uniformities in the thickness or from warping and provides a more uniform pressure distribution during lamination. A more uniform pressure during lamination results in better adhesion, fewer bubbles and wrinkles, more even lamination and the reduction of other physical defects in the PSA and sub-pad material.

The present invention thus provides a method and device for laminating CMP polishing pads. The embodiments described above are illustrative of the present invention and are not intended to limit the scope of the invention to the particular embodiments described. Accordingly, while one or more embodiments of the invention have been illustrated and described, it will be appreciated that various changes can be made therein without departing from the spirit or essential characteristics thereof. For example, the boards may have hardness that are the same or different from each other, or from the CMP pad material or CMP sub-pad, a top and bottom board may have different dimensions, the CMP pad may have a different structure than those provided in the illustrative examples as described herein. Accordingly, the disclosures and descriptions herein are intended to be illustrative, but not limiting, of the scope of the invention, which is set forth in the following claims.

What is claimed is:

1. A method of producing a chemical mechanical polishing (CMP) pad comprising:
    forming a stack comprising a board, a CMP pad material adjacent said board, and a backing having a first adhesive on at least a portion of a side adjacent said CMP pad material and a second adhesive including a pressure sensitive adhesive (PSA) and a release liner on at least a portion of a side opposite said CMP pad material, where the material of said board and said CMP pad material have similar composition; and
    compressing said stack by feeding said sack through pinch rollers to adhere said backing to said CMP pad material and form a laminate having a top side including said CMP pad material and a bottom side including said PSA and release liner; and
    separating said board from said laminate.

2. The method of claim 1, wherein said pinch rollers have a clearance of approximately 70% to approximately 95% of the thickness of said stack.

3. The method of claim 1, wherein the material of said board and said CMP pad material are thermoplastics.

4. The method of claim 3, wherein the material of said board and said CMP pad material are elastomers.

5. The method of claim 4, wherein said elastomer is cast urethane.

6. The method of claim 4, wherein said elastomer is foam urethane.

7. The method of claim 1, wherein the planar dimensions of said board are equal to or greater than the planar dimensions of said CMP pad material.

8. The method of claim 4, wherein the planar dimensions of said board is at least 10% larger than the planar dimensions of said CMP pad material.

9. The method of claim 1, wherein said board has a thickness of from about $1/16$" to about $1/4$" with a thickness tolerance of less than about $3/100$".

10. The method of claim 1, wherein said board has a recess on one face thereof, where said recess has a planar shape equal to larger than the planar shape of said CMP pad material and a depth approximately 50% to approximately 90% of the thickness of said CMP pad material.

11. The method of claim 1, wherein said first adhesive is a thermoset adhesive, and wherein said conditions include heating said backing to a temperature sufficient to activate said first adhesive.

12. The method of claim 11, wherein one of said pinch rollers is heated.

13. The method of claim 1, wherein said first adhesive is a PSA.

14. The method of claim 13, wherein said backing includes a CMP sub-pad between said first adhesive and said second adhesive.

15. The method of claim 13, wherein said board is a first board, wherein said stack further comprises a second board adjacent said release liner, and further comprising separating said second board from said laminate.

16. A method of producing a chemical mechanical polishing (CMP) pad comprising:
    forming a stack comprising a first board, a CMP pad material adjacent said board, a backing having a first adhesive including a pressure sensitive adhesive (PSA) on at least a portion of a side adjacent said CMP pad material and a second adhesive including a pressure sensitive adhesive (PSA) and a release liner on at least a portion of a side opposite said CMP pad material, and a second board adjacent said release liner, where the material of said first board, the material of said second board and said CMP pad material have similar composition; and
    compressing said stack by feeding stack through pinch rollers to adhere said backing to said CMP pad material and form a laminate having a top side including said CMP pad material and a bottom side including said PSA and release liner; and
    separating said first board and said second board from said laminate.

17. The method of claim 16, wherein said pinch rollers have a clearance of approximately 70% to approximately 95% of the thickness of said stack.

18. The method of claim 16, wherein the material of said board, the material of said second board, and said CMP pad material are urethane.

19. The method of claim 18, wherein said urethane is cast urethane.

20. The method of claim 18, wherein said urethane is foam urethane.

21. The method of claim 16, wherein the planar dimensions of said first board and said second board are each equal to or greater than larger than the planar dimensions of said CMP pad material.

22. The method of claim 16, wherein the planar dimensions of said first board and said second board are each at least 10% larger than the planar dimensions of said CMP pad material.

23. The method of claim 16, wherein said first board and said second board each have a thickness of from about 1/16" to about 1/4" with a thickness tolerance of less than about 3/100".

24. The method of claim 16, wherein said first board has a recess on one face thereof, where said recess has a planar shape equal to larger than the planar shape of said CMP pad material and a depth approximately 50% to approximately 90% of the thickness of said CMP pad material.

25. The method of claim 16, wherein said backing includes a CMP sub-pad between said first adhesive and said second adhesive.

* * * * *